Lin
UNITED STATES PATENT OFFICE.

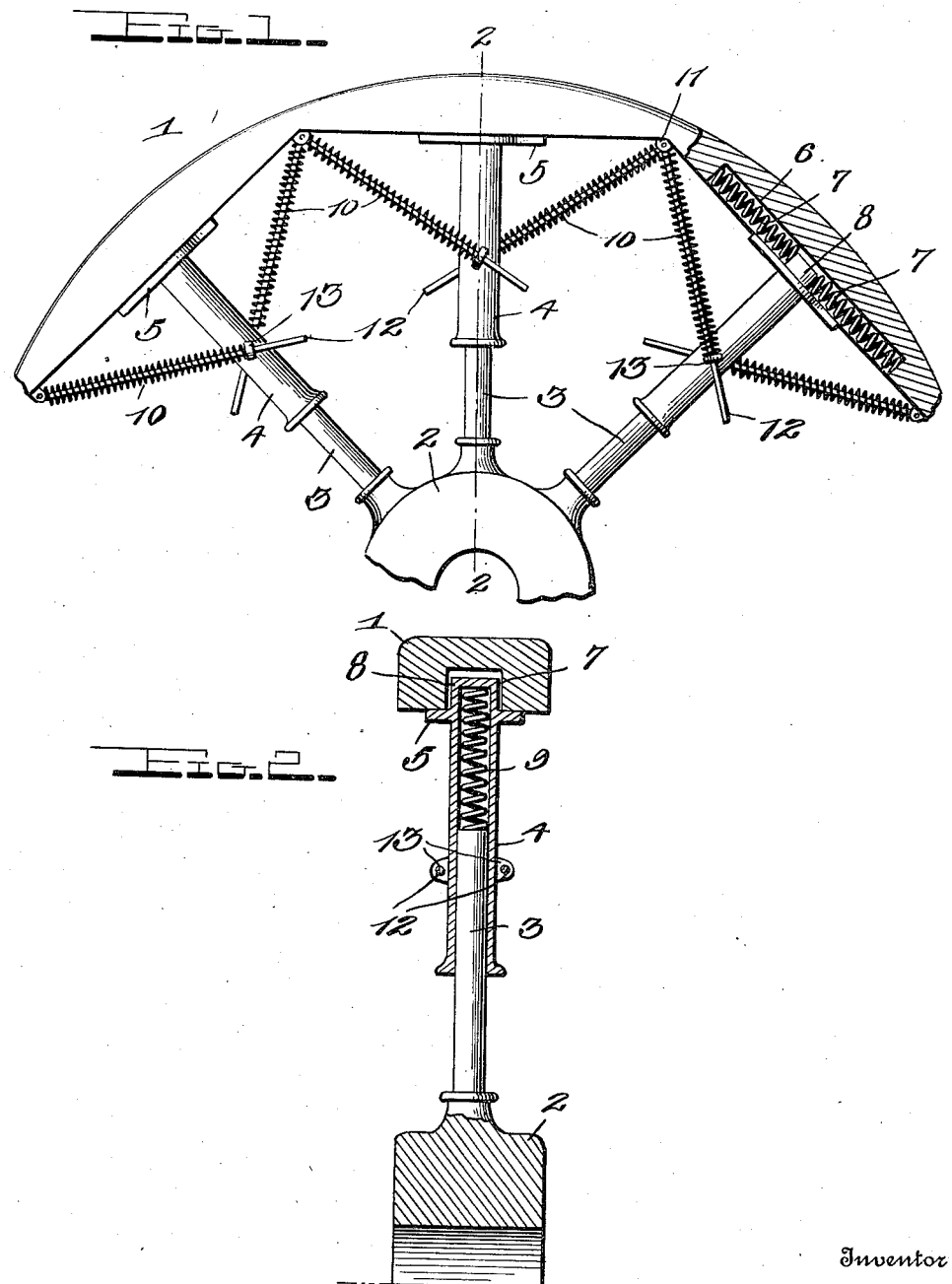

IRA NEELY HARTON, OF LISBON, NORTH DAKOTA.

SPRING-WHEEL.

1,028,210. Specification of Letters Patent. Patented June 4, 1912.

Application filed January 13, 1912. Serial No. 670,972.

*To all whom it may concern:*

Be it known that I, IRA NEELY HARTON, a citizen of the United States, residing at Lisbon, in the county of Ransom and State of North Dakota, have invented certain new and useful Improvements in Spring-Wheels, of which the following is a specification, reference being had to the accompanying drawings.

This invention relates to resilient wheels and has for its object to provide means whereby the usual pneumatic tires for wheels will be substituted by an arrangement of springs which will eliminate the necessity of such tires.

Other objects of this invention will become apparent as it is more fully set forth.

In the accompanying drawings which illustrate by way of example an embodiment of this invention, Figure 1 represents a portion of a wheel embodying this invention, and with parts in section to more fully show the construction of parts of the same. Fig. 2 is a sectional view taken along the line 2—2 of Fig. 1.

Similar reference characters refer to similar parts throughout the drawings.

In the drawings, the reference character 1 indicates the rim of a wheel in question, which is provided with a hub 2 of usual design. A plurality of spokes 3 are mounted on the hub 2, and extend radially therefrom and project into casings 4, as is clearly shown in Fig. 2. Adjacent to the outer portion 8 of the casings 4 are plates or washers 5 which are designed to engage the inner side of the rim 1 and to span the slots 6 that are formed in the rim and that extend circumferentially, as shown. In each of the slots 6 are coiled springs 7, which are arranged in pairs to engage on either side of the end portion 8 of the casings, and tend to keep the same properly positioned in the slots.

Disposed in the casings 4, are coil springs 9, which engage with the bottom of the casings and spokes respectively, as is clearly shown in the drawings, and form a resilient means for the wheel. Suitably hinged to the rim 1, as shown at 11, are rods 12, which extend and project through eye members 13 disposed on the casings 4. These rods are arranged so as to freely move within the eyes 13, as the casings move, under the action of the various springs in question. Coil springs 10 are disposed on the rods 12, in order to form a resilient reinforcement for the casings 4, as is clearly shown in Fig. 1.

The general operation of the device is as follows: The springs 9 take up the greater part of the radial jaw on the wheel. The springs 7 take up the tangential strain exerted by the spokes and casings, and the springs 10 act in the general way to assist in both sets of springs just referred to, so that the resilient action of the wheel is proportional to the stresses put upon it. The plate 5 provides a means for restricting the outward movement of the casing 4 and also for keeping the springs 7 within the slots 6.

Having thus described this invention, what is claimed is:—

A resilient wheel comprising a rim having a plurality of slots therein, a hub, a plurality of spokes radially disposed on said hub, casings mounted on the end portions of said spokes, plates disposed on said casings and arranged to engage with said rim and to span said slots, coiled springs disposed within said casings arranged to resiliently act on said spokes and said sleeves, resilient means disposed in said slots and arranged to engage with the outer end portions of said sleeves for tangentially acting on said casings, a plurality of rods hinged on said rim between said slots, eye members formed on the sides of said casings, the rods extending through said eye members, and coiled springs disposed on said rods and arranged to resiliently act on said eye members.

In testimony whereof I hereunto affix my signature in the presence of two witnesses.

IRA NEELY HARTON.

Witnesses:
 H. O. LEBO,
 KITTIE LEBO.

Copies of this patent may be obtained for five cents each, by addressing the "Commissioner of Patents, Washington, D. C."